US008581461B2

(12) United States Patent
Lin et al.

(10) Patent No.: US 8,581,461 B2
(45) Date of Patent: Nov. 12, 2013

(54) ENERGY TRANSFORMING APPARATUS (75) Inventors: Bor-Jeng Lin, Huwei Chen (TW);
Mi-Ching Tsai, Tainan (TW);
Cheng-Chi Huang, Tainan (TW)

(73) Assignee: National Formosa University (TW)

(*) Notice: Subject to any disclaimer, the term of this patent is extended or adjusted under 35 U.S.C. 154(b) by 323 days.

(21) Appl. No.: 13/065,479

(22) Filed: Mar. 23, 2011

(65) Prior Publication Data
US 2012/0242089 A1    Sep. 27, 2012

(51) Int. Cl.
*H02K 49/10* (2006.01)
(52) U.S. Cl.
USPC .......................................... 310/83; 290/1 A
(58) Field of Classification Search
USPC .................................. 290/1; 310/92
See application file for complete search history.

(56) References Cited

U.S. PATENT DOCUMENTS

| 1,392,349 | A | * | 10/1921 | Neuland | 310/98 |
| 1,410,215 | A | * | 3/1922 | Neuland | 290/15 |
| 1,515,321 | A | * | 11/1924 | Hall et al. | 475/152 |
| 2,271,087 | A | * | 1/1942 | Maier | 310/96 |
| 2,666,155 | A | * | 1/1954 | Kaplan | 310/105 |
| 3,378,710 | A | * | 4/1968 | Martin, Jr. | 310/104 |
| 3,523,204 | A | * | 8/1970 | Rand | 310/94 |
| 3,864,587 | A | * | 2/1975 | Landry | 310/103 |
| 5,013,949 | A | * | 5/1991 | Mabe, Jr. | 310/83 |
| 5,569,967 | A | * | 10/1996 | Rode | 310/103 |
| 8,143,823 | B2 | * | 3/2012 | Yang | 318/280 |
| 2004/0046468 | A1 | * | 3/2004 | Schrotter | 310/103 |
| 2007/0182262 | A1 | * | 8/2007 | Johnson | 310/103 |
| 2009/0308347 | A1 | * | 12/2009 | Hathaway et al. | 123/242 |

FOREIGN PATENT DOCUMENTS

| JP | 62160053 A | * | 7/1987 |
| JP | 10299637 A | * | 11/1998 |
| JP | 2001289153 A | * | 10/2001 |
| JP | 2005114163 A | * | 4/2005 |
| JP | 2005351336 A | * | 12/2005 |
| WO | WO 9823025 A1 | * | 5/1998 |

* cited by examiner

*Primary Examiner* — Joseph Waks
(74) *Attorney, Agent, or Firm* — William E. Pelton, Esq.; Cooper & Dunham LLP (57) ABSTRACT

An energy transforming apparatus has a controllable magnetic power gathering device and a transforming device to transform the non-continuous kinetic energy into electrical power to store in the power storage assembly. The controllable magnetic power gathering device has a non-continuous moved or linear reciprocating moved input end, a continuous rotating output end and a controllable energy-adjusting end, etc, to transform the impulse momentum into the continuous kinetic energy with the differential motion and using the non-contacting magnetic wheel transmission assembly to protect the overload effect. The transforming device has an energy transforming assembly, a circuit adjustment assembly and a power storage assembly. The circuit adjustment assembly is electrically connected with the energy transforming assembly to control the energy transforming assembly to transform the kinetic energy into electrical power. Accordingly, the energy transforming apparatus can transform non-continuous kinetic energy into continuous movement and further into electric power.

7 Claims, 7 Drawing Sheets

ENERGY TRANSFORMING APPARATUS

BACKGROUND OF THE INVENTION

1. Field of the Invention

The present invention relates to an apparatus, and more particularly to an energy transforming apparatus that can transform non-continuous kinetic energy into continuous movement and further into electric power.

2. Description of Related Art

A conventional energy transforming apparatus, such as a wind power generator can transform continuous rotating kinetic energy into electric power and has been widely used. However, the conventional energy transforming apparatus cannot effectively transform a non-continuous kinetic energy, such as non-continuous oscillating movement or linear reciprocating movement into electric power. A machine having a non-continuous movement or linear reciprocating movement, such as a forging or pressing machine has only little part of energy is applied to the power source, most of the energy are transmitted to a base of the machine or the ground and causes vibration (shock) or energy waste. For example, an automatic high speed die-cutting machine drives a cutting mold of a weight of 1200 kg to cut papers with the transmission of a toggle mechanism, and a reacting force of 400 ton will be applied back to the machine during the cutting process. Most of the reacting force will be transmitted to the base of the machine, and only about 2% of the reacting force is transmitted back to the power source. The force generated during the forging process is huge and causes vibration (shock) but cannot be used and transformed into useful energy.

To reduce and absorb the vibration on the base of the machine and the ground, shock-absorbing device is mounted on the machine. However, the shock-absorbing device can only dissipate the shock energy or vibration but cannot transform the shock energy or vibration into a useful energy. The conventional shock-absorbing devices waste all energy.

In addition, a conventional energy transforming apparatus that is connected to a machine does not have an overload protecting device. When the energy input into the energy transforming apparatus is over an affordable level, the conventional apparatus is easily damaged.

To overcome the shortcomings, the present invention provides an energy transforming apparatus to mitigate or obviate the aforementioned problems.

SUMMARY OF THE INVENTION

The main objective of the invention is to provide an energy transforming apparatus that can transform non-continuous kinetic energy into continuous movement and further into electric power.

The energy transforming apparatus has a controllable magnetic power gathering device and a transforming device. The controllable magnetic power gathering device has a non-continuous moved or linear reciprocating moved input end, a continuous rotating output end and a controllable energy-adjusting end, etc, to transform the impulse momentum into the continuous kinetic energy with the differential motion and using the non-contacting magnetic wheel transmission assembly to protect the overload effect. The transforming device has an energy transforming assembly, a circuit adjustment assembly and a power storage assembly. The energy transforming assembly has a kinetic energy input end connected to the output end of the power gathering device and an electrical power output end. The circuit adjustment assembly is electrically connected with the energy transforming assembly to control the energy transforming assembly to transform the kinetic energy into the electrical power. The power storage assembly is electrically connected with the energy transforming assembly to store the transformed electrical power inside.

With such an arrangement, the controllable magnetic power gathering device is connected to the transforming device in an energy-adjustable manner. With the differential motion between the input end and the energy-adjusting end of the power gathering device, the power gathering device has a kinetic energy accumulating function. When the energy is accumulated to a desired level, the energy-adjusting end can be controlled to a light load condition to generate transient impulse momentum to transmit the continuous kinetic energy to the output end of the power gathering device. Consequently, the energy transforming assembly can be driven to rotate and transform the kinetic energy into electrical power, and the electrical power is stored in the power storage assembly. With such an inertia-transforming apparatus having a capability of adjusting the input of an exterior energy, the energy transforming assembly can continuously transform kinetic energy into electrical power. When the energy transforming apparatus is applied to a machine having a non-continuous movement or linear reciprocating movement, the apparatus can be controlled at a high inertia condition to accumulate energy in a non-contacting manner. When the energy is accumulated to a desired level, the differential motion between the input end and the energy-adjusting end of the power gathering device can be controlled to a low inertia and non-loading condition transiently. The impulse momentum will be transformed into the variation of kinetic energy by using the differential motion of dynamic energy braking, not using contact brakes. With the non-continuous inertia transformation, the variation of continuous kinetic energy of impulse momentum is achieved, such that the partial controlled energy of the huge unused energy of the machine can be transformed to continuous kinetic energy from the non-continuous inertia by the power gathering device and further be transformed into electrical power by the transforming device. With the capability of quick action in a short time of the controllable magnetic power gathering device, the transforming efficiency of the energy can be enhanced.

Moreover, the controllable magnetic power gathering device of the energy transforming apparatus can selectively use non-contacting magnetic wheel transmission assembly. With the capabilities of large transmission ratio region, without using lubricant and sealing, with no temperature rise of non-contact forced transmission, and with slip when over load act and with auto-contact under transmitted force, the inertia at the adjusting end can be reduced to lower wear of driving and to improve sensitivity of reaction. Accordingly, an overload protecting effect is provided and the safety of using the energy transforming apparatus is improved.

In addition, a unidirectional bearing or connector may be mounted between the central shaft of the controllable magnetic power gathering device and the kinetic energy input end of the energy transforming assembly so as to prevent influence from applying to the movement of the energy input shaft.

With the arrangement of the unidirectional bearing or connector, the transmission direction between the controllable magnetic power gathering device and the energy transforming assembly is unidirectional. This means that when the rotating speed of the central shaft of the controllable magnetic power gathering device is higher than that of the energy transforming assembly, the speed of operation of the energy transforming assembly can be accelerated. When the rotating speed of the central shaft of the controllable magnetic power gathering device is lower than that of the energy transforming assembly, the speed of operation of the controllable magnetic power gathering device is kept from being influenced by the energy transforming assembly. The loading inertia disc body is mounted before the unidirectional bearing or connector to serve as the load of the energy gathering device.

The energy transforming apparatus in accordance with the present invention can be applied to a high inertia condition and can absorb partially and transform the energy that a toggle mechanism transmits to the base or ground to electrical power. When overload occurring, a protecting and recovery effect can be provided by the sliding movement within magnetic mechanism. The energy transforming apparatus can also be applied to a machine having a non-continuous rotation or linear movement to transform partially the huge wasted energy during the operation of the machine into electrical power, so the apparatus in accordance with the present invention can transform the wasted kinetic energy generated in a factory into a reused and useful energy.

Other objects, advantages and novel features of the invention will become more apparent from the following detailed description when take in conjunction with the accompanying drawings.

DETAILED DESCRIPTION OF PREFERRED EMBODIMENT

Figure 1:
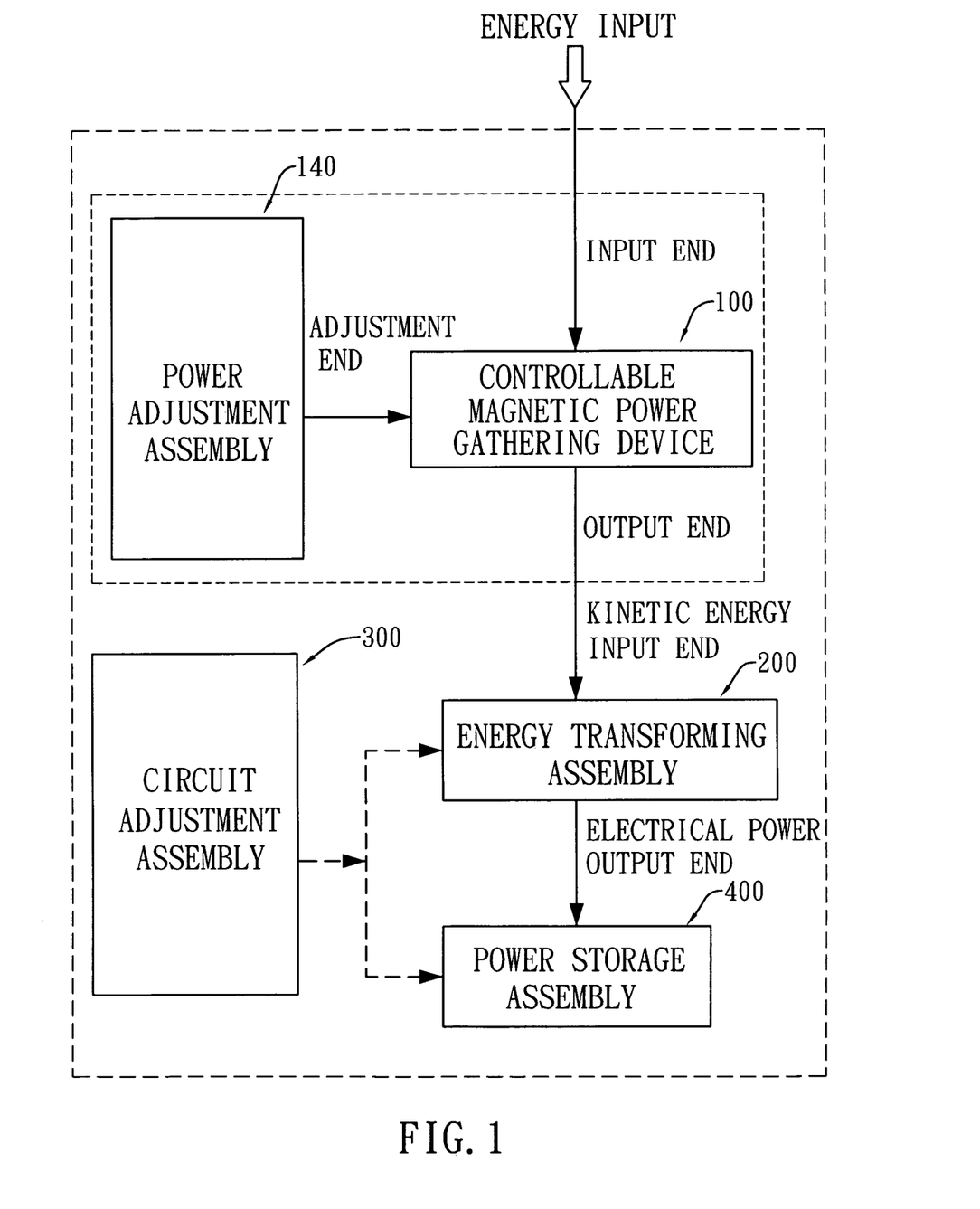
FIG. 1 is a block diagram of an energy transforming apparatus in accordance with the present invention.

With reference to FIG. 1, an energy transforming apparatus in accordance with the present invention can transform non-continuous kinetic energy into continuous movement by the transformation from impulse momentum to the variance of the kinetic energy and comprises a controllable magnetic power gathering device 100 and a transforming device. The transforming device can transform kinetic energy into electrical power and comprises an energy transforming assembly 200, a circuit adjustment assembly 300 and a power storage assembly 400. The circuit adjustment assembly 300 is electrically connected with the energy transforming assembly 200 to control the energy transforming assembly to transform the kinetic energy into electrical power. The power storage assembly 400 is electrically connected with the energy transforming assembly 200 to store the transformed electrical power inside.

Figure 2A:
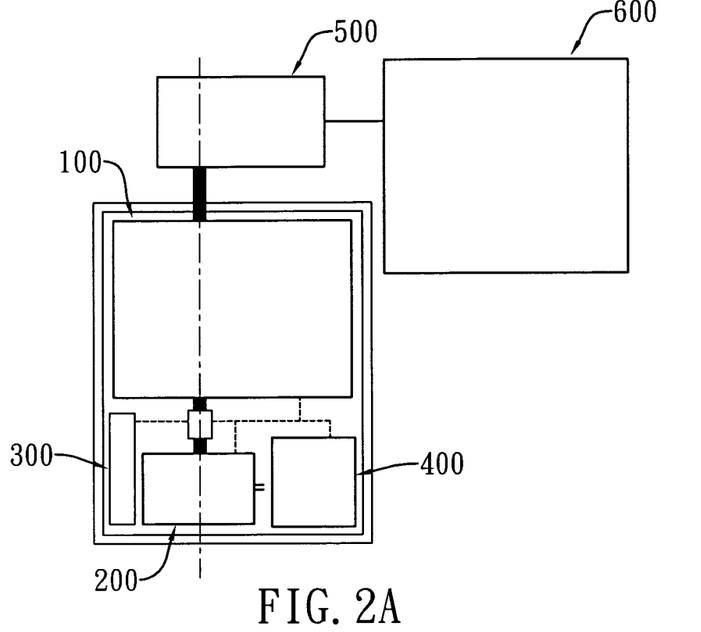
FIG. 2A is a block diagram of a first operation embodiment of the energy transforming apparatus in FIG. 1.
Figure 2B:
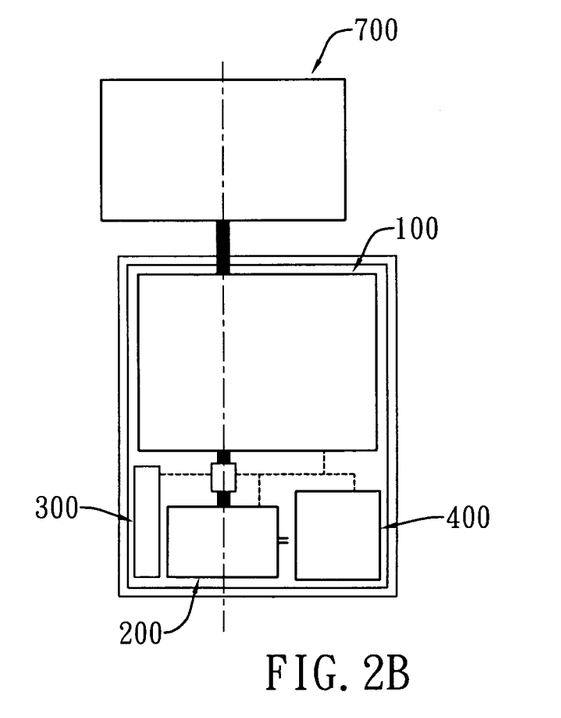
FIG. 2B is a block diagram of a second operation embodiment of the energy transforming apparatus in FIG. 1.

With reference to FIG. 2A, the energy transforming apparatus can be applied to a non-continuous rotation mechanism or a reciprocating linear mechanism. The power gathering device 100 can be connected to a linkage transmission mechanism 500 of a working machine 600, such as a forging press or a cutting apparatus. With reference to FIG. 2B, the power gathering device 100 of the energy transforming apparatus can be connected to a continuous rotation mechanism 700, such as an electric vehicle.

The power gathering device 100 may be a transmission device having capabilities of magnetically controlling transmission effect and providing a dynamically kinetic energy-adjusting function, has an input end, an output end and an energy-adjusting end and comprises a transmitting assembly and a power adjustment assembly 140. The input end is connected to power gathered mechanism to input the energy into the transmitting assembly. The power adjustment assembly 140 is mounted on the energy-adjusting end to control the amount of the gathered energy input into the transmitting assembly. When the working machine suddenly pours the forging energy into the mechanism base, the impulse momentum of non-continuous motion would be transformed the variance of the kinetic energy of continuous motion by the power adjustment assembly 140.

Figure 3:
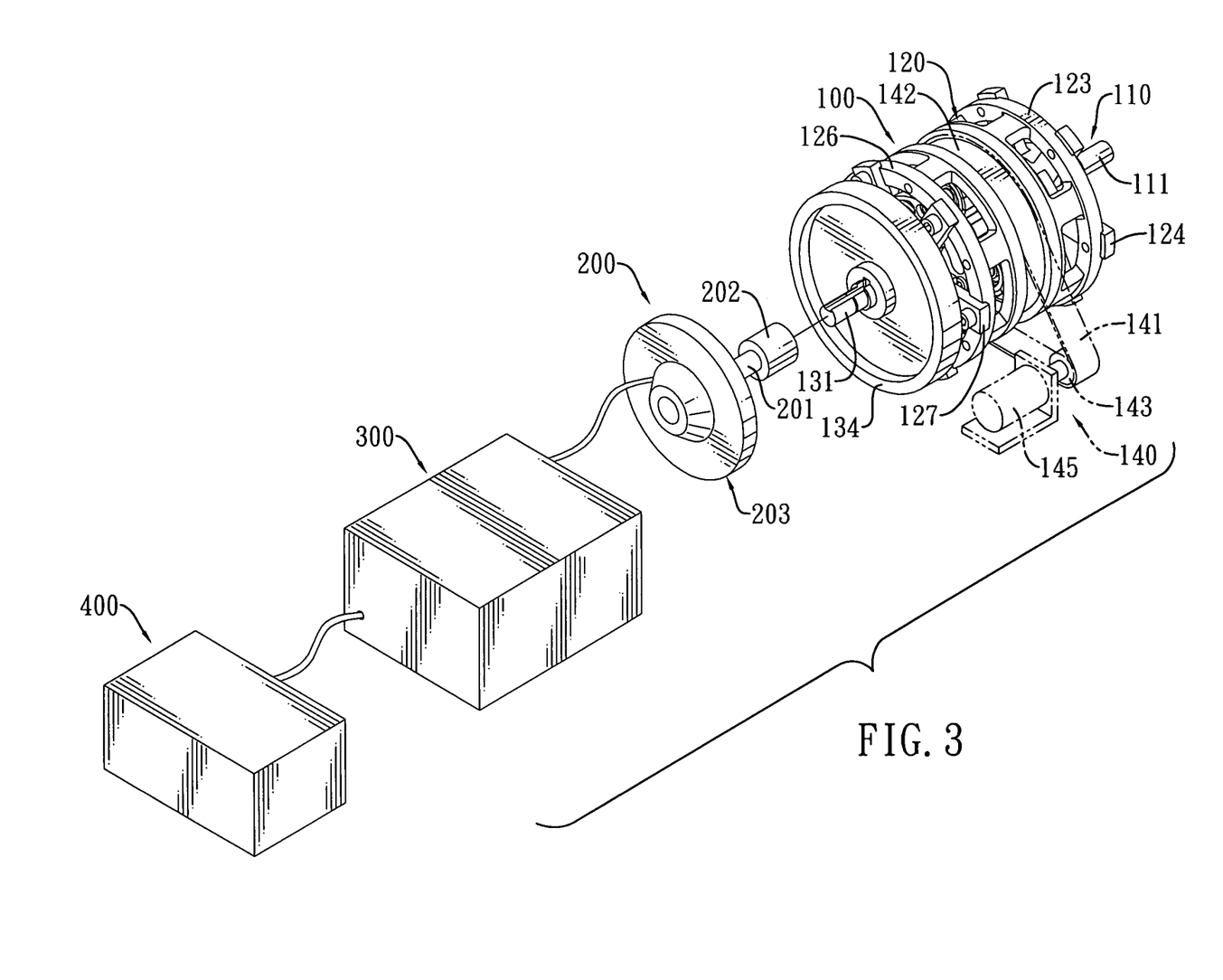
FIG. 3 is a perspective view of a preferred embodiment of the energy transforming apparatus in FIG. 1.
Figure 4:
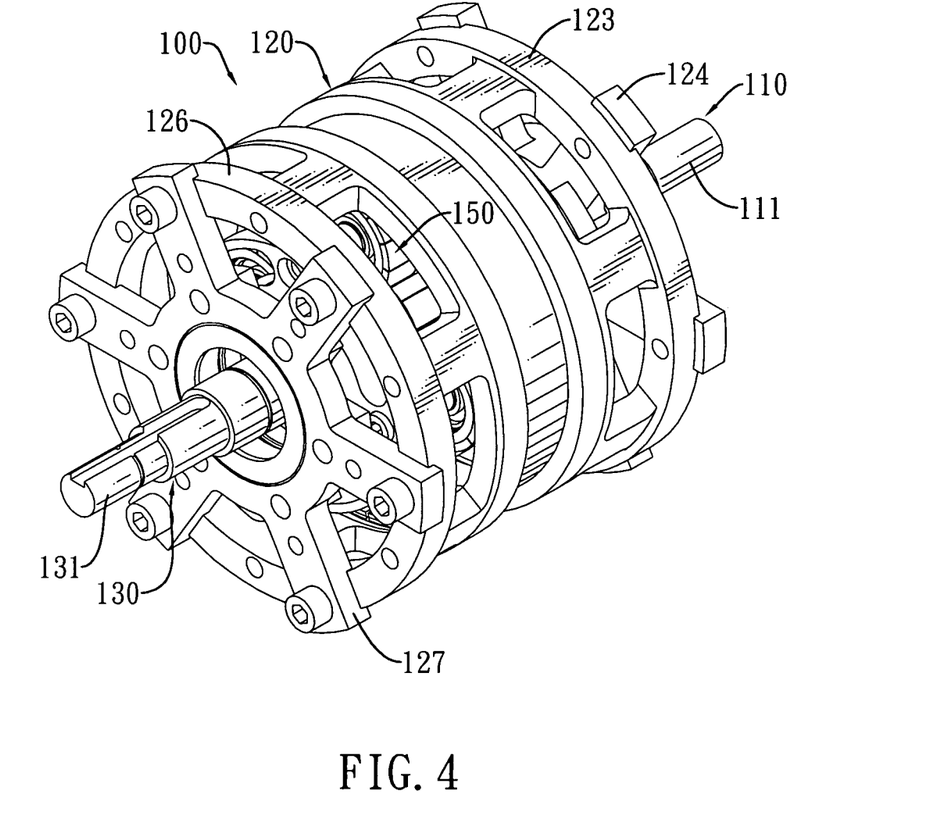
FIG. 4 is a perspective view of a controllable magnetic power gathering device of the energy transforming apparatus in FIG. 1.
Figure 5:
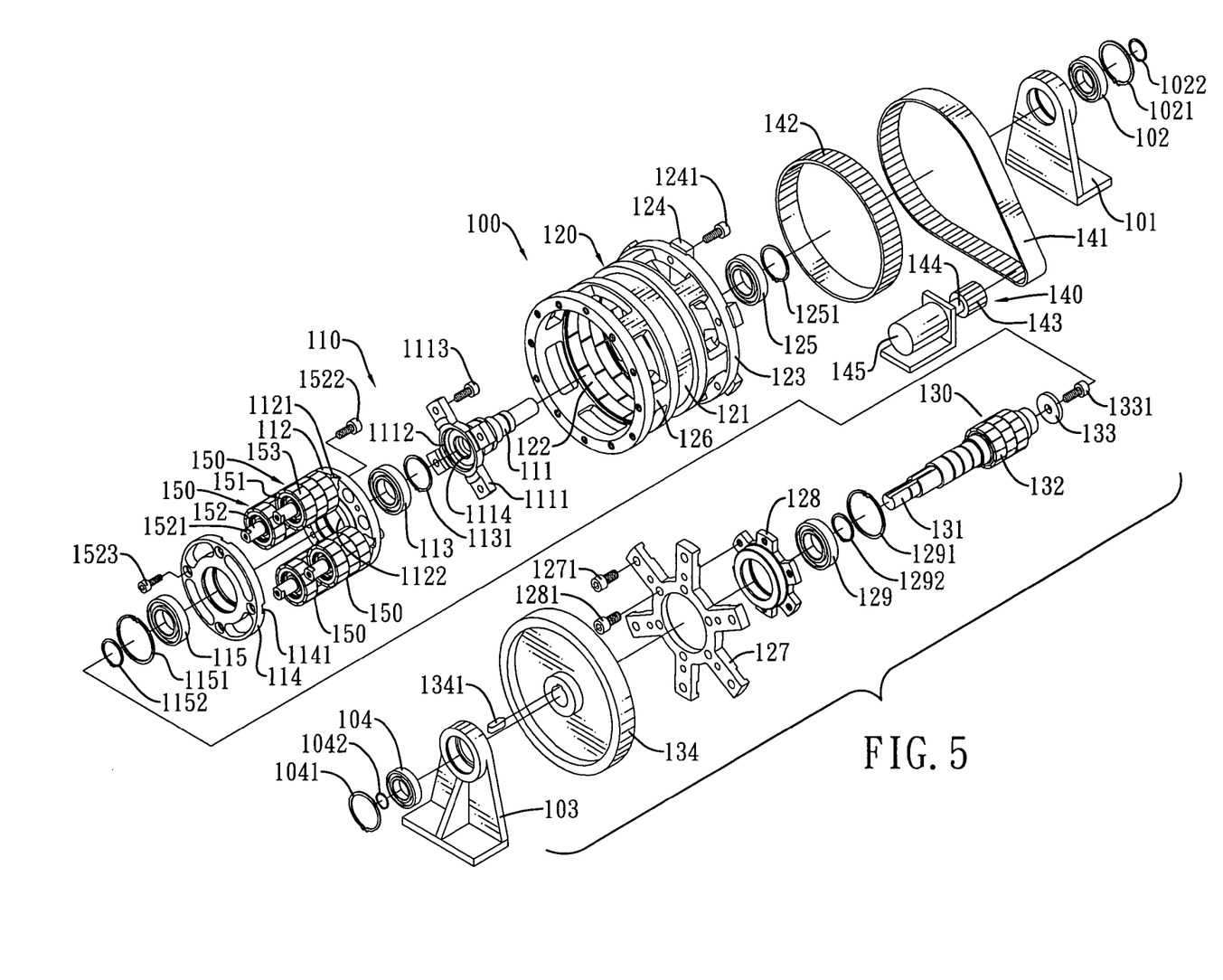
FIG. 5 is an exploded perspective view of the controllable magnetic power gathering device of the energy transforming apparatus in FIG. 4.
Figure 6:
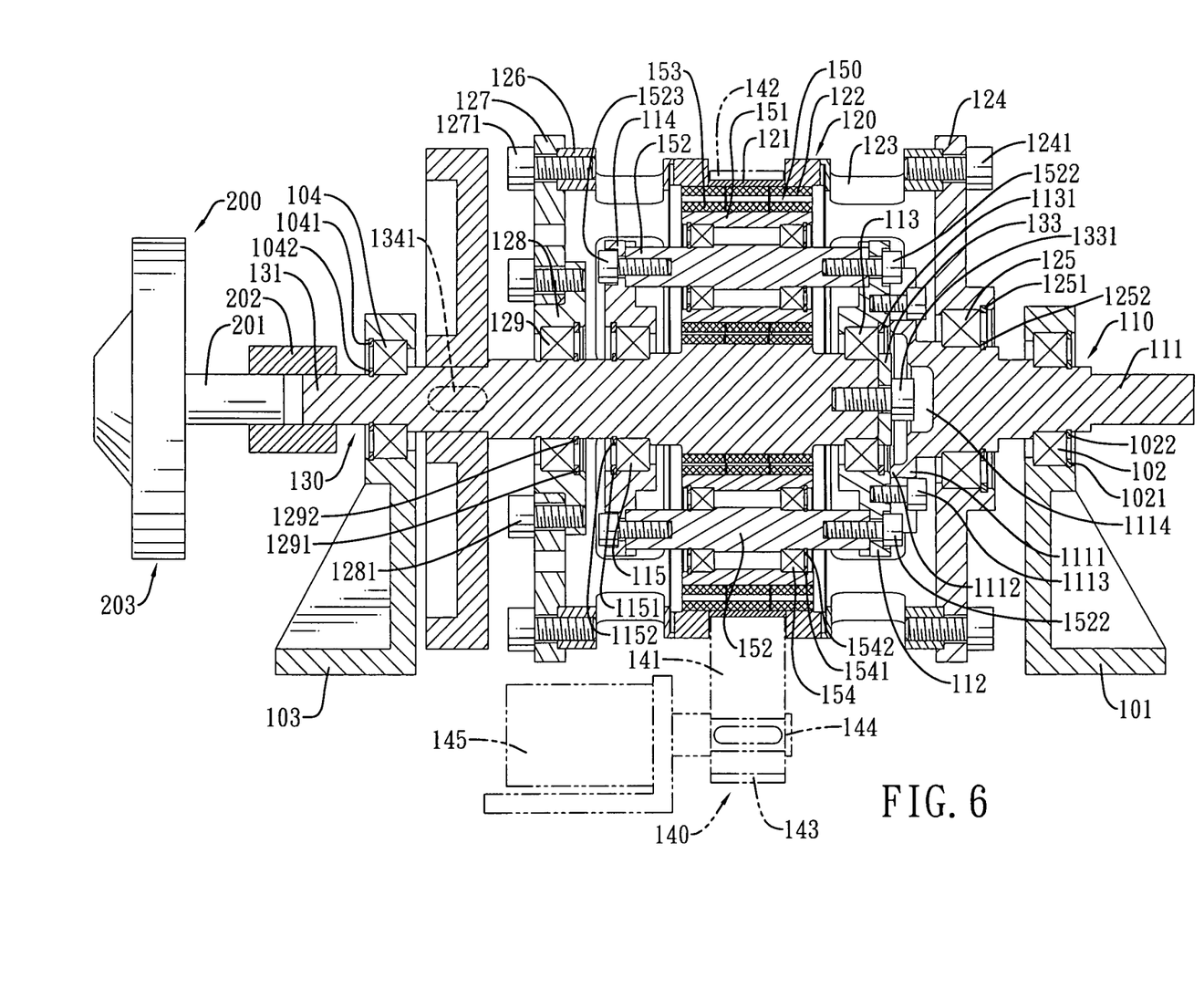
FIG. 6 is a side view in partial section of the controllable magnetic power gathering device of the energy transforming apparatus in FIG. 4.
Figure 7:
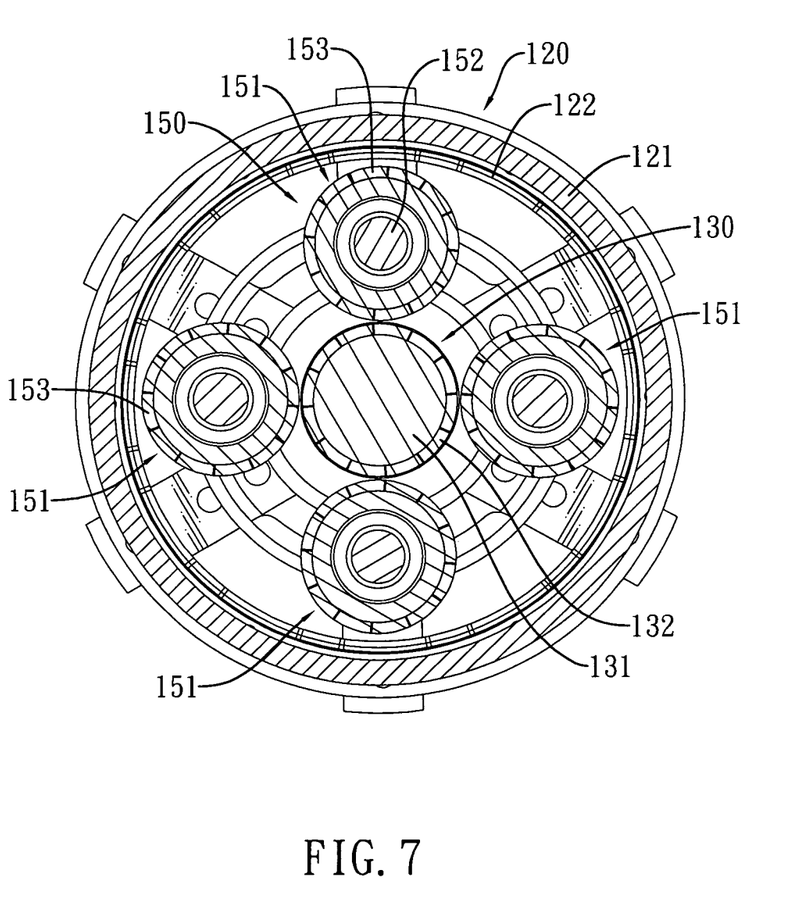
FIG. 7 is an end view in partial section of the controllable magnetic power gathering device of the energy transforming apparatus in FIG. 4.

With reference to FIG. 3, the power gathering device 100 has a central shaft 131, a loading inertia disc body 134 and a unidirectional connector 202. The loading inertia disc body 134 is mounted securely around the central shaft 131 to serve as the load of the operation of the power gathering device 100. Preferably, the loading inertia disc body 134 can be provided with magnets. With change of intervals between the magnets, load of the operation of the power gathering device 100 is adjusted. The unidirectional connector 202 may be a unidirectional bearing, is mounted on one end of the central shaft 131 and is connected to a transforming shaft 201 on the energy transforming assembly 200. With the arrangement of the unidirectional connector 202, the energy can be transported to the energy transforming assembly 200 from the power gathering device 100 in unidirectional and is kept from being transported back to the power gathering device 100 from the energy transforming assembly 200. In addition, the power adjustment assembly 140 that is connected to the energy-adjusting end of the power gathering device 100 may be a pulley driving assembly, a gear driving assembly or an annular driving device.

The energy transforming assembly has a kinetic energy input end and an electrical power output end. The kinetic energy input end of the energy transforming assembly is connected to the output end of the power gathering device 100 with a unidirectional connector 202. The electrical power output end is connected electrically with the power storage assembly 400 via the circuit adjustment assembly 300 to store the transformed electrical power inside.

With reference to FIGS. 3 to 6, the controllable magnetic power gathering device 100 comprises a non-contact controllable magnetic differential motion wheel transmitting assembly that has capabilities of non-wear braked action by using kinetic energy, protecting overload. Alternatively, the power gathering device 100 may comprise a gear mechanism and a torque limiter mounted on the input end of the power gathering device 100 to provide an overload-protecting effect. The non-contact controllable magnetic differential motion wheel transmitting assembly comprises a magnetic controlling wheel assembly 120, a central shaft assembly 130 and a magnetic wheel assembly 150.

The magnetic controlling wheel assembly 120 has a wheel base and multi-layer controlling wheel magnets 122. The wheel base is collar-shaped and serves as the energy-adjusting end of the power gathering device 100. The wheel base has an inner surface, a collar body 121, a front collar 123, a rear collar 126, a front cover 124 and a rear cover 127. The front collar 123 and the rear collar 126 are mounted respectively on a front end and a rear end of the collar body 121. The front cover 124 is mounted securely on the front collar 123 with fasteners 1241 and has a front cover bearing 125 mounted on the front cover 124 with a internal retaining ring 1251. The rear cover 127 is mounted on the rear collar 126 with fasteners 1271 and has a rear bearing base 128 and a rear cover bearing 129. The rear bearing base 128 is mounted securely on the rear cover 127 with fasteners 1281, and the rear cover bearing 129 is mounted in the rear bearing base 128 with a C-shaped fastener 1291 and aligns with the front cover bearing 125.

The controlling wheel magnets 122 are mounted around the inner surface of the wheel base and have N and S magnetic poles arranged alternatively. Preferably, The controlling wheel magnets 122 are mounted around the inner surface of the collar body 121.

The central shaft assembly 130 is mounted rotated rotatably in the wheel base of the magnetic controlling wheel assembly 120 to define an inner space between the inner surface of the wheel base and has a central shaft 131, multiple central shaft magnets 132 and a loading inertia disc body 134. The central shaft 131 serves as the output end of the power gathering device 100 and has a front end and a rear end extending out of the rear cover 127 of the wheel base. The front end of the central shaft 131 is provided with an end disc 133 with a disk fastener 1331. The rear end of the central shaft 131 is mounted through the rear cover bearing 129, and a C-shaped fastener 1292 is mounted around the central shaft 131 to hold the rear cover bearing 129 at position on the central shaft 131. The central shaft magnets 132 mounted around the central shaft 131 and have N and S magnetic poles arranged alternatively. The loading inertia disc body 134 is mounted on and rotated with the rear end of the central shaft 131 with a key 1341. In addition, a unidirectional connector 202, such as a unidirectional bearing is mounted on the rear end of the central shaft 131 to connect the central shaft 131 with the energy transforming assembly 200 in unidirectional.

The power gathering device 100 may further have a rear supporting bracket 103 and a rear supporting bearing 104 mounted on the rear supporting bracket 103 with a C-shaped fastener 1041. The rear end of the central shaft 131 is mounted through and held in the rear supporting bearing 104 with a C-shaped fastener 1042.

The magnetic complex wheel assembly 110 is mounted in the inner space between the inner surface of the wheel base and the central shaft assembly 130 and comprises a front wheel bracket 112, an energy input shaft 111, a rear wheel bracket 114 and multiple differential wheel assemblies 150.

The front wheel bracket 112 is mounted around the front end of the central shaft 131 and has central hole 1122 and a front wheel bearing 113. The central hole 1122 is defined centrally through the front wheel bracket 112. The front wheel bearing 113 is mounted in central hole 1122 of the front wheel bracket 112 with a C-shaped fastener 1131 and abuts with the end disc 133 on the front end of the central shaft 131.

The energy input shaft 111 is connected securely with the front wheel bracket 112, co-axially aligns with the central shaft 131 and serves as an input end of the power gathering device 100. The energy input shaft 111 has a front end, a rear end, a central recess 1112 and multiple fixing wings 1114. The front end of the energy input shaft 111 is mounted through the front cover bearing 113 on the front cover 112 of the wheel base with a C-shaped fastener 1252. Preferably, the power gathering device 100 may further have a front supporting bracket 101 and a front supporting bearing 102 mounted on the front supporting bracket 101 with a C-shaped fastener 1021. The front end of the energy input shaft 111 is mounted through and held in the front supporting bearing 102 with a C-shaped fastener 1022. The central recess 1114 is defined axially in the rear end of the energy input shaft 111, aligns with the central hole 1122 in the front wheel bracket 112 and holds the end disc 133 and the disk fastener 1331 inside. The fixing wings 1114 are radially formed on and protrude from the rear end of the energy input shaft 111 and are mounted securely on the front wheel bracket 112 with fasteners 1113.

The rear wheel bracket 114 is spaced from the front wheel bracket 112 and a rear wheel bearing 115 is mounted on the rear wheel bracket 114 with a C-shaped fastener 1151. The central shaft 131 is mounted through the rear wheel bearing 115 with a C-shaped fastener 1152.

The differential wheel assemblies 150 are mounted between the front wheel bracket 112 and the rear wheel bracket 114, are held in the inner space between the inner surface of the wheel base and the central shaft assembly 130 and are kept from being in contact with the inner surface of the wheel base and the central shaft assembly 130. Each differential wheel assembly 150 has a wheel shaft 152, a differential wheel 151 and multiple wheel shaft magnets 153. The wheel shaft 152 is mounted securely between the front wheel bracket 112 and the rear wheel bracket 114 and has two ends respectively provided with two flats 1521. To securely connect the ends of the wheel shaft 152 with the wheel brackets 112, 114, each wheel bracket 112, 114 has multiple engaging grooves 1121, 1141 defined radially in a side face of the wheel bracket 112, 114 facing to the other. One end of the wheel shaft 152 is held in and engaged one of the engaging grooves 1121, 1141 in a corresponding wheel bracket 112, 114 with the flats 1521. Multiple fasteners 1522, 1523 are mounted through the wheel bracket 112, 114 and are screwed respectively into the ends of the wheel shafts 152 to securely connect the wheel shafts 152 with the wheel brackets 112, 114. The differential wheel 151 is mounted rotatably around the wheel shaft 152 with a differential wheel bearing 154. The wheel shaft magnets 153 are mounted around the differential wheel and have N and S magnetic poles arranged alternatively.

The power adjustment assembly 140 is connected to the energy-adjusting end of the power gathering device 100 and preferably is connected to the wheel base of the controlling wheel assembly 120. The power adjustment assembly 140 comprises a driving device 145 and a pulley assembly. The driving device 145 has a driving shaft 144. The pulley assembly has a driving pulley 143, a driven pulley 142 and a driving belt 141. The driving pulley 143 is mounted around the driving shaft 144 of the driving device 145. The driven pulley 142 is mounted on the energy-adjusting end of the power gathering device 100 and preferably is mounted around the wheel base. The driving belt 141 is mounted around the driving pulley 143 and the driving pulley 142. Accordingly, the wheel base can be driven to rotate relative to the central shaft assembly 130 and the magnetic complex wheel assembly 110. Alternatively, the power adjustment assembly 140 may be a gear type reduction assembly or an annular direct current motor.

With reference to FIGS. 3 to 7, the magnets 122, 132, 153 on the wheel base, the central shaft 131 and the differential wheels 141 can be arranged into at least two annular groups. The magnetic poles (N-poles and S-poles) of adjacent magnets 122, 132, 153 are arranged in alternative. Alternatively, the magnets 122, 132, 153 may be arranged in a spiral arrangement.

With reference to FIG. 2, the transforming device comprises an energy transforming assembly 200, a circuit adjustment assembly 300 and a power storage assembly 400. The energy transforming assembly 200 may be an electromagnetic actuator or the like. The energy transforming assembly 200 may comprise an energy transformer 203 comprising a stator and a rotor. The stator has a coil. The rotor may be a magnet and a transforming shaft 201 connected with the output end of the power gathering device 100 with or without a unidirectional connector 202, such as a unidirectional bearing. Alternatively, an electrical clutch is mounted between the transforming shaft 201 and the output end of the power gathering device 100 to connect or disconnect the transforming shaft 201 with or from the output end of the power gathering device 100.

The circuit adjustment assembly 300 is electrically connected with the coil of the stator of the energy transforming assembly 200 to control the energy transforming assembly to transform the kinetic energy into the electrical power.

The power storage assembly 400 is electrically connected with the energy transforming assembly 200 via circuit adjustment assembly 300 the to store the transformed electrical power inside and may be selected from one of the group consisting of Lithium battery, Lead acid battery, fuel cell, Nickel hydride battery and ultra-capacitor battery.

In use, the energy input shaft 111 is connected to and rotated by an energy source, such as a forging machine to gather energy from the energy source, and the central shaft 131 is connected with the energy transforming assembly 200. When the energy input shaft 111 is rotated, the wheel base and the central shaft 131 are rotated by the magnetic complex wheel assembly 110 due to the attractive forces generated by the magnetic poles of the magnets 122, 132, 153 on the differential wheel assemblies 150 between the wheel base and the central shaft 131. The alternative arrangement of the magnetic poles of the magnets 122, 132, 153 on the differential wheel assemblies 150, the wheel base and the central shaft 131 will push the wheel base and the central shaft 131 to rotate. Accordingly, the energy transforming assembly 200 can be driven to transform kinetic energy to electrical power that is transported and stored in the power storage assembly 400 via the circuit adjustment assembly 300.

Therefore, the transmission effect between the differential wheel assemblies 150, the wheel base and the central shaft 131 is achieved based on the magnetic attraction forces between the magnets 122, 132, 153. The transmission effect of the power gathering device 100 can be adjusted by changing the numbers or arrangement of the magnets 122, 132, 153 to fit with different operation needs. When the energy source is over the transmission effect provided by the magnets 122, 132, 153, a sliding movement between the magnets 122, 132, 153 will occur to stop the transmission effect between the magnets 122, 132, 153 and an overload-protecting effect is provided.

In addition, with the arrangement of the power adjustment assembly 140, the wheel base can be rotated by the driving device 145 with the transmission of the pulley assembly to adjust the transmission effect between the magnets 122, 153 on the differential wheel assemblies 150 and the wheel base. Consequently, the energy provided to the energy transforming apparatus can be adjusted to keep overloading from occurring.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An energy transforming apparatus comprising:
    a controllable magnetic power gathering device having a non-continuous moved or linear reciprocating moved input end, a continuous rotating output end and a controllable energy-adjusting end, to transform the impulse momentum into the continuous kinetic energy; and
    a transforming device comprising
    an energy transforming assembly having a kinetic energy input end connected to the output end of the power gathering device and an electrical power output end;
    a circuit adjustment assembly electrically connected with the energy transforming assembly to control the energy transforming assembly to transform the kinetic energy into the electrical power; and
    a power storage assembly electrically connected with the energy transforming assembly to store the transformed electrical power inside, wherein
    the controllable magnetic power gathering device comprises a non-contacting controllable magnetic differential wheel transmitting assembly comprising
    a magnetic controlling wheel assembly having
    a wheel base serving as the energy-adjusting end of the power gathering device and having an inner surface; and
    multi-layer controlling wheel magnets mounted around the inner surface of the wheel base and having N and S magnetic poles arranged alternatively;
    a central shaft assembly mounted rotatably in the wheel base of the magnetic controlling wheel assembly to define an inner space between the inner surface of the wheel base and the central shaft assembly and having
    a central shaft serving as the output end of the power gathering device;
    multi-layer central shaft magnets mounted around the central shaft and having N and S magnetic poles arranged alternatively; and
    a loading inertia disc body mounted on the central shaft; and
    a magnetic wheel assembly comprising
    a front wheel bracket;
    an energy input shaft connected securely with the front wheel bracket and serving as an input end of the power gathering device;
    a rear wheel bracket spaced from the front wheel bracket; and
    multi-layer differential wheel assemblies mounted between the front wheel bracket and the rear wheel bracket, held in the inner space between the inner surface of the wheel base and the central shaft assembly and kept from being in contact with the inner surface of the wheel base and the central shaft assembly, and each differential wheel assembly having
    a wheel shaft;
    a differential wheel mounted rotatably around the wheel shaft; and
    multi-layer wheel shaft magnets mounted around the differential wheel and having N and S magnetic poles arranged alternatively.

2. The energy transforming apparatus as claimed in claim 1, wherein
    the power gathering device further comprises
    a front supporting bracket having a front supporting bearing; and a rear supporting bracket having a rear supporting bearing; and the energy input shaft is mounted through the front supporting bearing; and the central shaft has an end mounted through the rear supporting bearing.

3. The energy transforming apparatus as claimed in claim 2, wherein the power gathering device further has a unidirectional connector mounted between the an output end of the power gathering device and the kinetic energy input end of the energy transforming assembly of the transforming device.

4. The energy transforming apparatus as claimed in claim 3, wherein the power storage assembly is selected from one of the group consisting of Lithium battery, Lead acid battery, fuel cell, Nickel hydride battery and ultra-capacitor battery.

5. The energy transforming apparatus as claimed in claim 1, wherein the power gathering device further comprises a power adjustment assembly connected to the energy-adjusting end of the power gathering device and comprising a driving device having a driving shaft; and a pulley assembly having a driving pulley mounted around the driving shaft of the driving device;

a driven pulley mounted around the energy-adjusting end of the power gathering device; and a driving belt mounted around the driving pulley and the driving pulley.

6. The energy transforming apparatus as claimed in claim 1, wherein the power gathering device further has a unidirectional connector mounted between the an output end of the power gathering device and the kinetic energy input end of the energy transforming assembly of the transforming device.

7. The energy transforming apparatus as claimed in claim 1, wherein the power storage assembly is selected from one of the group consisting of Lithium battery, Lead acid battery, fuel cell, Nickel hydride battery and ultra-capacitor battery.

* * * * *